G. WILLIAMS.
DEVICE FOR STUDYING FINGER PRINTS AND THEIR CLASSIFICATION.
APPLICATION FILED JAN. 24, 1922.
1,425,157.
Patented Aug. 8, 1922.
2 SHEETS—SHEET 1.
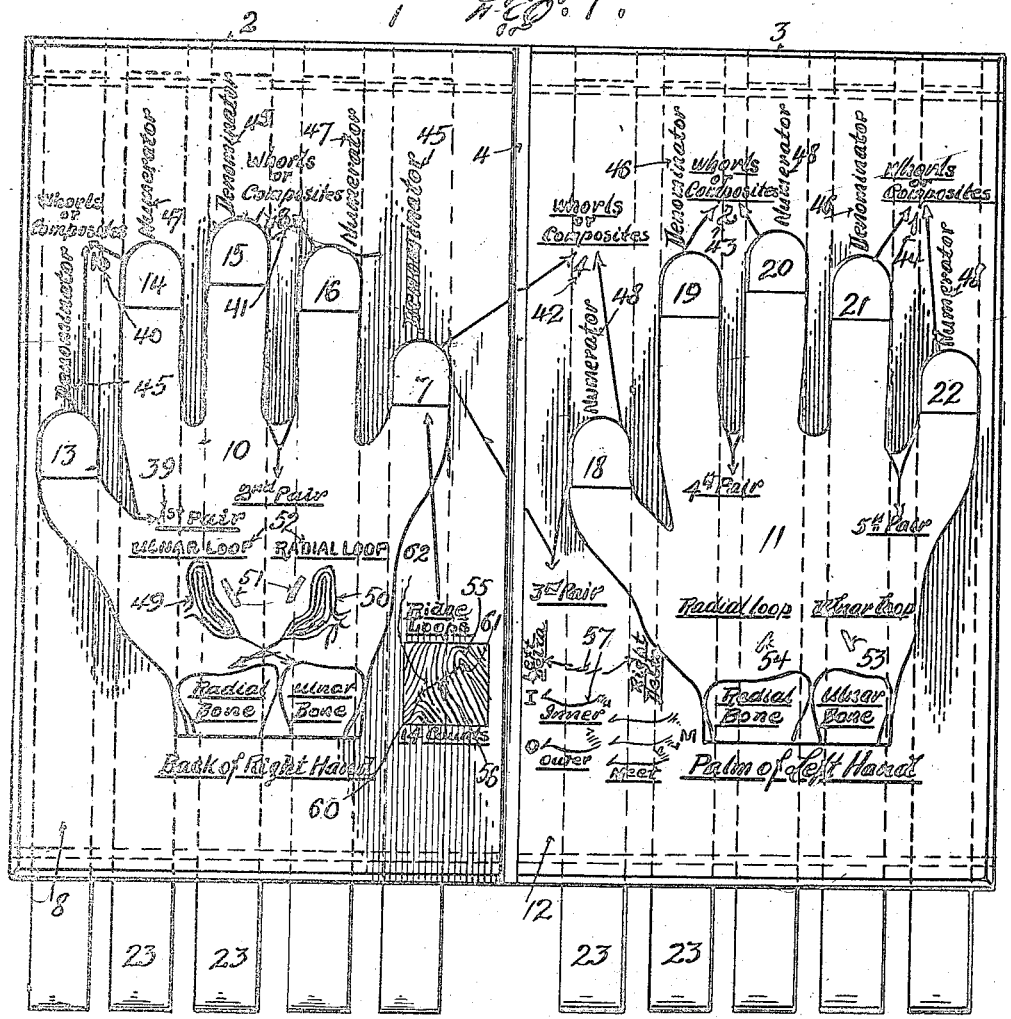
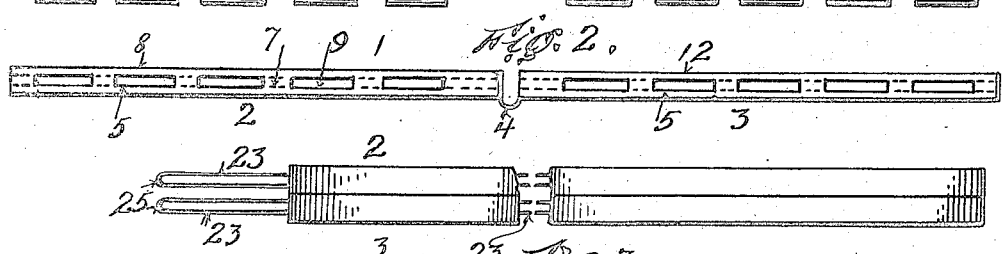

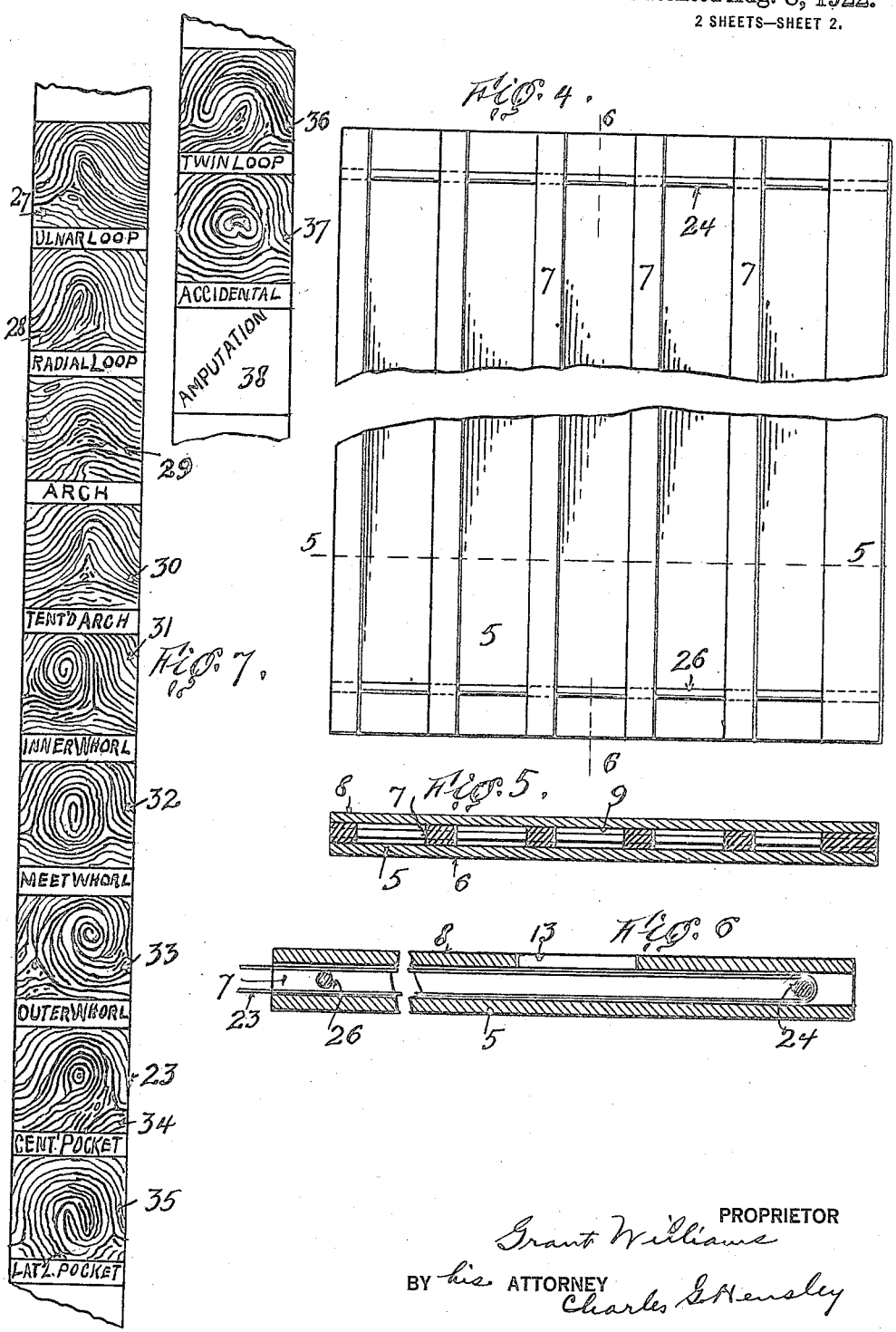

UNITED STATES PATENT OFFICE.

GRANT WILLIAMS, OF PATCHOGUE, NEW YORK.

DEVICE FOR STUDYING FINGER PRINTS AND THEIR CLASSIFICATION.

1,425,157.  Specification of Letters Patent.  Patented Aug. 8, 1922.

Application filed January 24, 1922. Serial No. 531,456.

*To all whom it may concern:*

Be it known that I, GRANT WILLIAMS, a citizen of the United States, and a resident of Patchogue, in the county of Suffolk and State of New York, have invented certain new and useful Devices for Studying Finger Prints and Their Classification, of which the following is a specification.

Heretofore, it has been difficult to study finger prints and especially the method of classifying and filing such prints, a subject which is of increasing importance because of the adoption of the finger print system of identification by many police organizations and other bodies. The object of my invention is to provide a simple and effective device by means of which instructors may teach the study and classification of finger prints, by which students may become familiar with these subjects, and which may also be used by experienced classifiers in their work. By means of the present device every possible combination of finger prints can be reproduced. By this I do not mean that every individual design of every finger print can be reproduced, but with sets of representative prints every possible combination falling within any of the known classification systems can be reproduced and the student or experienced operator can quickly determine from it the particular place in which any set of finger prints is to be filed in a classification file; or the place in a classification file where any set of finger prints should be found. The present device is not only useful to the instructor and student but it is also useful to classifier and searcher because time can be saved by its use and in many cases errors may be avoided.

With the present device it is possible to reproduce any combination of finger prints falling within any general class and also those falling within every known sub-class.

The device comprises in part a chart bearing the representation of a pair of human hands, together with pictorial representations of specimen finger prints adapted to be associated with the chart so that the specimens or fac-similes will bear the same relation that they do on the human hands and in addition, I provide suitable indicia for classification purposes.

In the drawings forming part of this application,

Figure 1 is a plan view of the chart opened up for use,

Figure 2 is an end view thereof with the strips removed,

Figure 3 is a side view thereof,

Figure 4 is a plan view with the top cover removed,

Figure 5 is a sectional view taken on the line 5—5 of Figure 4,

Figure 6 is a similar view taken on the line 6—6 of Figure 4,

Figure 7 is a face view of one of the strips.

The invention may take various forms but the essential features are the chart representing the human hands and the members bearing representations or fac-similes of finger prints which may be associated with the chart in various combinations corresponding with any known specimen of finger prints or any hypothetical set of finger prints.

In the drawings I have shown by way of illustration of one form of my invention, a chart member 1 in the form of a folder or book which is always ready for use. This comprises the members 2 and 3 hinged along their meeting edges 4 so that they may be folded one upon the other. These members are preferably made of sheet material such as cardboard, pressed board or fibroid and they may be covered with leather or cloth on their outer surfaces like the covers of a book. I have here shown these members as consisting of sheets of cardboard 5 or other material having an exterior covering of cloth 6 and they are hinged together so that they may be closed like a book or opened to expose their inner surfaces in contiguous relation. There are dividing strips 7 attached to one surface of the back members 5 and on the upper edges of these are attached the top members 8. These several parts may be secured together by glue or in any other manner. This construction forms a number of parallel rectangular pockets or chambers 9, extending vertically or up and down in relation to the chart.

Upon the face members 8 of the chart there are formed either by printing, lithographing, embossing or otherwise, the representations or outlines of a pair of human hands. At the left I have shown the representation or outline 10 representing the right hand; and the hand is here illustrated as if the user of the chart were looking at the back of the hand. At the right and on the member 3 I have shown the representation or outline of a left hand 11 positioned as if the user of the chart were looking at the palm of the hand. The reason for reversing the hands in this manner is because in classifying finger prints the little finger of the right hand and the thumb of the left hand form a pair and with the arrangement shown these appear in juxtaposition and therefore it is easier to bear in mind that the particular finger and thumb form a pair.

The face members 8 and 12 are provided with cut outs or openings at the tips of the several fingers and thumbs of the hands represented in the outlines and on the right hand these are numbered 13 to 17 from left to right; and on the left hand representation they are numbered 18 to 22 from left to right. These cut outs or openings are of sufficient size to correspond with the end joints of the several fingers and thumbs in order that the full patterns of the several finger prints may be exposed through these openings.

In each channel 9 I have arranged an endless strip 23 which may be made of fibre, celluloid or other pliable material. These strips are formed endless like a belt and at the top of the chart they loop around a strip 24 extending across the members 2 and 3 having their ends fastened thereto. The loops 25 at the opposite or lower ends of the chart pass around similar strips 26 and preferably this loop is sufficiently long to project below the edge of the chart where it may be manipulated to move the strip to bring any one of the sample finger prints thereon in line with one of the finger openings. There will be one of these strips for each finger and thumb of both hands represented on the chart, making ten in all and they align with the several apertures 13,—17, 18,—22.

These several strips are all alike so that a description of one will apply to all. In Figure 7 I have shown a face view of that portion of the strip which bears the finger print fac-similes or examples. The several fac-similes are arranged in a vertical row lengthwise of the strip and while their order of arrangement may be varied I prefer the arrangement shown. At 27 for instance, I have shown an enlarged fac-simile of a finger print of the type or pattern known as an ulnar loop. Below this I have shown a fac-simile 28 of the pattern known as a radial loop. Next below this is a fac-simile 29 of a pattern known as an arch. Next below this is the fac-simile 30 of the pattern of a tented arch. Next below this is the fac-simile 31 of a pattern called an inner whorl. Next below this is the fac-simile 32 of a pattern called a meet whorl. Next below this is the fac-simile 33 of a pattern called an outer whorl. Next below this is a fac-simile 34 of a pattern called a central pocket. Next below this is a fac-simile 35 of a pattern called a lateral pocket. Next below this is a fac-simile 36 of a pattern called a twin loop. Next below this is a fac-simile 37 of a pattern called an accidental. Below this is a blank 38 denoting an amputation and is used to indicate that a finger or thumb is missing.

It will be apparent that by manipulating one of the strips 23 any one of the above mentioned patterns may be brought to register with the opening 13. In like manner each of the other strips may be manipulated to bring any individual pattern to register with any of the several finger openings.

On the chart there are markings designating the groupings of the several fingers and thumbs into pairs corresponding with the "Henry" system of classification. For instance, the lettering 39 indicates that the thumb and forefinger of the right hand comprise the first pair; the middle finger and ring finger of the same hand form the second pair; the little finger of the same hand and the thumb of the left hand form the third pair; the first finger and middle finger of the left hand form the fourth pair; and the ring finger and the little finger of the left hand form the fifth pair.

In the primary classification of finger prints the fingers in the several pairs have different numerical values in what is known as the "Henry" system. Only whorls and composites are given a numerical value in this classification and their numerical values are indicated on the chart. For instance, where a whorl or composite appears in the first pair it has the numerical value 16, as is indicated at 40. If one appears in the second pair it has the value of 8 as indicated at 41. In like manner I have designated at 42, 43 and 44, the values 4, 2 and 1 for the third, fourth and fifth pairs.

In this system of classification certain fingers (one in each pair) are designated for a denominator and others (one in each pair) are designated for a numerator in a fraction. At 45 I have designated the thumb, middle and little fingers of the right hand as denominators, these being the first fingers of their respective pairs; and at 46 I have designated the index finger and ring finger of the left hand as denominators, (1st, 3d, 5th, 7th and 9th or odd fingers) these being the first fingers of their respective pairs. In like manner I have designated at 47, 48 the second finger of each pair as numerators. (2d, 4th, 6th, 8th, 10th or even fingers).

In association with the right hand of the chart I have shown at 49 the pattern of an ulnar loop and at 50 the pattern of a radial loop to indicate the direction of these in relation to this hand and to the ulnar and radial bones from which they take their names. The marks 51 indicate the directions of these loops and the names of the loops appear at 52. In like manner I have indicated at 53 and 54 the directions of the ulnar and radial loops in association with the left hand. At 55 I have shown the pattern of a small finger print of the right hand and indicated by the arrow 56 the method of counting ridge loops on this finger. At 57 I have shown the method of tracing whorls to determine whether a particular whorl is to be classified as an inner, outer or meet whorl, as now practiced.

In using the device the student may be given a hypothetical combination of finger prints to classify or he may examine the fingers of a known person and then set up a combination corresponding therewith and determine the classification of the combination both as to the primary classification and every known sub-classification. The user may start by moving the strip associated with the right thumb to bring a pattern to register with the aperture 13 corresponding with the right hand thumb pattern of the example to be copied, i. e., of the hand of the person being examined or the hypothetical example given the student. This pattern will not necessarily be an actual print of a human thumb or finger but merely an arbitrary pattern. The user will then proceed to do the same with all the other strips, bringing patterns to register with the several apertures to correspond with the different fingers of the hands under consideration. When the strips 23 have all been adjusted to reproduce the desired combination the student then proceeds to classify the set of finger prints of the combination.

The primary classification, represented as a fraction, will first be determined as follows: For the denominator the student will ascertain whether a whorl or a composite pattern appears in the thumb aperture 13, this being the first finger (thumb) of the first pair. If a whorl or composite appears here it will have the numerical value 16, because this is the designated value for the first pair. The student then examines the pattern at the aperture 15 of the right hand middle finger and if this is a whorl or composite it has the numerical value of 8 and this is added to the 16 and he has 24. He then ascertains whether a whorl or composite pattern appears at the aperture 17 on the little finger of the right hand; and if so, he adds the numerical value 4 to the previously obtained 24, making 28. He then does the same with the aperture 19 of the fore finger of the left hand and if a whorl or composite appears here he adds 2 to the 28, making 30. He then determines if a whorl or composite pattern appears at aperture 21 of the ring finger of the left hand and if so, he adds the numerical value 1, making a total of 31. He then adds, arbitrarily, the numeral 1, making a total of 32, which is the highest denominator in the primary classification under the Henry system, which is the one used in this description; although the device is not limited in its use to any one system.

If whorls or composites had not appeared at any of the denominator finger openings in the above reading the total would have been correspondingly less because in this primary classification only whorls and composites are considered or have a numerical value. If there were no whorls or composites in any of the denominator fingers the calculation would be 0 but to every total the numeral 1 is added arbitrarily in order that combinations entirely lacking in whorls or composites in the denominator and numerator will come in the first compartment of a filing cabinet and be separate from others, to be selected from each other by sub-classifications.

The student may then proceed to determine the numerator of the fraction. He first determines whether a whorl or composite pattern appears in the aperture 14 of the fore finger of the right hand (the first "numerator" finger) and if one is found here it has the value 16. If a whorl or composite appears in the aperture 16 of the right hand ring finger it has the numerical value 8 which is added to the 16 and this makes 24. The same course is followed with regard to the left hand thumb aperture 18, index aperture 20 and little finger aperture 22, adding the respective numerical values if whorls or composites appear in any of these. To the total is arbitrarily added the numeral 1. The fraction is then written down thus, $\frac{32}{32}$. According to the combination, the fraction may have from 1 to 32 for a numerator and from 1 to 32 for a denominator, and thus will determine in which compartment of a filing cabinet the combination of finger prints under examination is to be filed.

For subclassification the student examines the forefinger aperture 14 of the right hand on the chart and ascertains whether the pattern here is a radial or ulnar loop, a whorl or composite, an arch or tented arch, he places a representative letter such as A for an arch, T for tented arch, U for ulnar loop and R for radial loop, down as the numerator of a fraction. If the fore finger and middle finger of this hand have the same kind of pattern (a pair) as where both are ulnar loops then both are indicated in the numerator, thus U. U. If there is a whorl in the right fore finger aperture then the student determines whether it is an inner, outer or meet whorl according to well known methods, and in that case he places an I, and M or an O, for the numerator to signify not only that this finger has a whorl pattern but also its kind, i. e., either inner, outer or meet. It is not necessary to describe here the method of determining the type of whorls as it is well understood and in extensive use today. (See 57.) The student then examines the fac-similes in the left hand fore finger aperture 19 and if it is an inner, outer or meet whorl, (including composites) an arch, tented arch, ulnar or radial loop he places a corresponding letter in the denominator of the fraction. If the pattern on the fore finger and middle finger of this hand are alike, thus constituting a pair, the letter is used twice. An example of such a fraction might be thus $\frac{U,U}{I,M}$. This would mean that there are ulnar loops in the fore and middle fingers of the right hand and inner and meet whorls in the fore and middle fingers of the left hand and this would determine the position of the specimen under consideration in the sub-classification.

The final classification is obtained by counting the ridges of the little finger of the right hand, as indicated at 59 in the drawing. A straight line drawn from the delta 60 to the inner terminus of the loop 61 bisects certain ridges 62 and by counting these ridges the final classification number is found. (The outer or inner termini are not counted). In the example shown, the ridge count is 14. If there is no loop in the little finger of the right hand the ridge count is simply omitted; but it is not necessary to here go into every phase of classification, especially as the methods may differ in some respects.

All in the one over one primary classification it is apparent, will have no whorls or composites in either hand and in that case the lettered series is resorted to for a sub-classification of all specimens in this main or primary class. For this the student uses the forefinger of both hands as the "fulcrum" and the letters for these are capitals whereas, the others are in small letters placed before or after the capital according to the finger position. The letters from the right hand reading are used as a numerator and those of the left hand as a denominator. If the pattern of the forefinger of the right hand is a tented arch then the capital letter T is placed in the numerator. If the right thumb pattern is an arch a small a is placed to the left of the T (in the numerator). If the middlefinger pattern is a radial loop, a small r is placed to the right of the T. If the ring and little fingers of this hand both have arches then $2^a$ is placed to the right of the above, making the numerator $a$, T, $r$, $2^a$. The student then passes to the left hand for the denominator. The fore finger may be a radial loop and then R, is placed in the denominator. If the thumb pattern is a tented arch $t$, is placed to the left of R. If the middle, ring and little fingers of this hand are all arches $3^a$, will be placed after R, thus making the denominator $t$, R, $3^a$.

The ridge counting on the little finger of the right hand is employed for the final classification, the same as described above.

It will be apparent that every combination of finger prints can be reproduced on the device with the specimen patterns and from these every classification, including primary, sub-class and final, can be made according to present systems of classification or any which may be hereafter evolved.

Having described my invention, what I claim is,

1. A device of the class described comprising a chart having thereon the representations of the human hands, and movable devices for producing in association with said chart, various combinations representing finger print patterns.

2. A device of the class described comprising a chart having thereon the representations of the human hands, and movable devices having finger print patterns thereon and adapted to be associated with said chart to produce various combinations of patterns representing finger prints.

3. A device of the class described comprising a chart having thereon the representations of the human hands, and movable devices each having a series of finger print patterns thereon and adapted to be moved in relation to said chart to produce various combinations of patterns on the finger tips of said hand representations, corresponding with actual or hypothetical finger print combinations.

4. A device of the class described comprising a chart having thereon the representations of the human hands, and having apertures in the finger tip portions of said hands, and movable devices each having a series of finger print patterns thereon adapted to be individually brought into register with the respective apertures to produce various combinations of patterns corresponding with actual or hypothetical finger print combinations.

5. A device of the class described comprising a chart composed of folding sections, each section having the representation of a human hand thereon, arranged whereby said hands will appear in contiguous relation when said chart is opened, and having apertures in the finger tip portions of said hands, and movable devices each having a series of finger print patterns thereon adapted to be individually brought into register with the respective apertures to produce various combinations of patterns corresponding with actual or hypothetical finger print combinations.

6. A device of the class described comprising a chart having thereon the representations of the human hands arranged to show the back of the right hand at the left of the chart and the palm of the left hand at the right of the chart, whereby the right hand little finger and the left hand thumb will appear following each other on the chart, and movable devices for producing in association with said chart various combinations representing finger print patterns.

7. A device of the class described comprising a chart having thereon the representations of the human hands arranged to show the back of the right hand at the left of the chart and the palm of the left hand at the right of the chart, whereby the right hand little finger and the left hand thumb will appear following each other on the chart, said chart having indicia grouping adjacent fingers in pairs, and movable devices for producing in association with said chart various combinations representing finger print patterns.

8. A device of the class described, comprising a chart having spaced walls one of which is provided with the representations of the human hands and having apertures in the finger tip portions thereof, a movable member between said walls for each finger aperture and each having a series of finger print patterns adapted to be individually brought into register with the respective apertures.

Signed at the city, county and State of New York, this 17 day of January, 1922.

GRANT WILLIAMS.